(12) United States Patent
Tchernook et al.

(10) Patent No.: US 12,174,119 B2
(45) Date of Patent: Dec. 24, 2024

(54) DEVICE AND METHOD FOR LUMINESCENCE ANALYSIS OF MULTIPLE SAMPLES

(71) Applicant: JENOPTIK Optical Systems GmbH, Jena (DE)

(72) Inventors: Andrei Tchernook, Limbach-Oberfrohna (DE); Stephan Roth, Jena (DE); Abdullah Saif Mondol, Jena (DE)

(73) Assignee: Jenoptik Optical Solutions GmbH, Jena (DE)

( * ) Notice: Subject to any disclaimer, the term of this patent is extended or adjusted under 35 U.S.C. 154(b) by 145 days.

(21) Appl. No.: 17/913,879

(22) PCT Filed: Mar. 16, 2021

(86) PCT No.: PCT/EP2021/056606
§ 371 (c)(1),
(2) Date: Sep. 23, 2022

(87) PCT Pub. No.: WO2021/190991
PCT Pub. Date: Sep. 30, 2021

(65) Prior Publication Data
US 2023/0124532 A1   Apr. 20, 2023

(30) Foreign Application Priority Data

Mar. 25, 2020  (DE) .................. 10 2020 108 291
Mar. 26, 2020  (DE) .................. 10 2020 108 432 U

(51) Int. Cl.
*G01N 21/64*          (2006.01)

(52) U.S. Cl.
CPC ..... *G01N 21/6452* (2013.01); *G01N 21/6456* (2013.01); *G01N 2021/6478* (2013.01); *G01N 2021/6484* (2013.01)

(58) Field of Classification Search
CPC ........... G01N 21/6452; G01N 21/6456; G01N 2021/6478; G01N 2021/6484
See application file for complete search history.

(56) References Cited

U.S. PATENT DOCUMENTS

| | | | |
|---|---|---|---|
| 6,331,441 B1 | 12/2001 | Balch et al. | |
| 6,556,299 B1* | 4/2003 | Rushbrooke | G01N 21/6452 356/417 |
| 6,686,582 B1 | 2/2004 | Volcker et al. | |
| 6,855,541 B2 | 2/2005 | Tashiro et al. | |
| 7,906,767 B2 | 3/2011 | Furlan et al. | |
| 10,908,083 B2 | 2/2021 | Kato et al. | |
| 2003/0133113 A1* | 7/2003 | Hajduk | G01N 21/21 356/367 |

(Continued)

FOREIGN PATENT DOCUMENTS

DE           197 36 641 A1    3/1999
DE   10 2010 010 741 A1    9/2011

(Continued)

*Primary Examiner* — John R Schnurr
(74) *Attorney, Agent, or Firm* — Muncy, Geissler, Olds & Lowe, P.C.

(57) ABSTRACT

The invention relates to an apparatus for simultaneously analysing luminescence of a plurality of samples. The apparatus comprises a fibre-optic plate.

16 Claims, 9 Drawing Sheets

(56) References Cited

U.S. PATENT DOCUMENTS

| | | | |
|---|---|---|---|
| 2009/0316113 A1* | 12/2009 | Ernst | G03B 5/00 352/244 |
| 2019/0323070 A1 | 10/2019 | Hassibi et al. | |
| 2019/0346369 A1 | 11/2019 | Ozcan et al. | |
| 2019/0351414 A1 | 11/2019 | Eltoukhy et al. | |

FOREIGN PATENT DOCUMENTS

| | | |
|---|---|---|
| DE | 11 2015 005 747 T5 | 9/2017 |
| EP | 1 027 591 B1 | 12/2003 |
| EP | 1 681 555 A1 | 7/2006 |
| EP | 1 681 556 A1 | 7/2006 |
| EP | 2 148 187 A1 | 1/2010 |
| EP | 1 875 214 B1 | 8/2012 |
| EP | 1 511 990 B1 | 3/2015 |
| GB | 2 239 900 A | 7/1991 |
| GB | 2 315 130 A | 1/1998 |
| JP | S 63-298137 A | 12/1988 |
| JP | H 10-281994 A | 10/1998 |
| JP | 2005-077260 A | 3/2005 |
| WO | WO 95/01559 A2 | 1/1995 |
| WO | WO 2008/011675 A1 | 1/2008 |

\* cited by examiner

ND METHOD FOR
LUMINESCENCE ANALYSIS OF MULTIPLE
SAMPLES

This nonprovisional application is a National Stage of International Application No. PCT/EP2021/056606, which was filed on Mar. 16, 2021, and which claims priority to German Patent Application No. 10 2020 106 291.6, which was filed in Germany on Mar. 25, 2020 and German Patent Application No. 10 2020 108 432.3, which was filed in Germany on Mar. 26, 2020, and which are all herein incorporated by reference.

BACKGROUND OF THE INVENTION

Field of the Invention

The invention relates to an apparatus and a method for analysing luminescence of multiple samples in parallel.

Description of the Background Art

EP1681555 has disclosed "fluorescence imaging by means of telecentric excitation and imaging optical units", which leads to very large structural dimensions on account of the large distance required between the field lens and the sample. A low collection efficiency of the sample luminescence as a result of the intrinsically low numerical aperture of the telecentric optical units is also disadvantageous.

In EP1681556, only "fluorescence imaging by means of telecentricity" is achieved, with the excitation light not being input coupled on the optical axis. However, this does not solve the underlying problem of the structural dimension. Moreover, telecentric systems require a field lens. The low collection efficiency of the sample luminescence is also characteristic for this solution.

EP2148187A1 presents the "excitation and imaging optical unit for detecting fluorescence". In this case, the field lens is replaced by a field lens array. Individual field lens arrays are required for the various microtitre plates.

This concept was already presented in EP1027591B1—"Optical array system and reader for micro titer plates"—albeit not in the context of the PCR.

EP1511990B1 presents "fluorescence measuring equipment with an excitation source". In this case, the structural dimension is reduced by folding the illumination and detection multiple times. The solution requires a complex dual-mirror structure. Other methods, like in WO 2008/011875 A1— "Arrangement and method for multichannel fluorescence measurement in PCR samples"—, use other methods—e.g., fibre-based methods in this case—for exciting and detecting the fluorescence. All fibre-based solutions require individual optical apparatuses for different microtitre plates.

DE102010010741 A1 has disclosed a light-guide apparatus for emitting and receiving light. A light-guide bundle is used in the process. The complicated handling of optical fibre bundles is disadvantageous.

SUMMARY OF THE INVENTION

The object of the invention lies in the provision of a simple method for analysing luminescence of a multiplicity of samples, and an apparatus to this end. In particular, the method should be suitable for a simultaneous quantitative luminescence analysis of a plurality of biochemical samples that are processed in deep matrix-like vessels such as microtitre plates, for example. The sample vessels with different numbers of sample wells should be able to be analysed without requiring a modification of the apparatus where possible. A part of the optical apparatus should be able to be integrated in a possibly required hot lid that protects the samples against evaporation during thermal processing.

The object is achieved by an apparatus according to claim 1 and a method according to claim 14.

The invention provides a simple method for analysing fluorescence of a multiplicity of samples, and an apparatus to this end. Moreover, other luminescence analyses are also possible. The present invention allows a titre plate with samples to be analysed without requiring an object-side telecentric optical unit or a scanner. Moreover, the light intensity on the light sensor may be higher than in the case of previously known methods. At the same time, the fibre-optic plate can serve as a lid for covering a sample array for a luminescence analysis.

In particular, the invention provides a simple method for analysing fluorescence of biochemical samples that are arranged in flat, matrix-like containers, for example microtitre plates, and an apparatus to this end. Moreover, other simultaneous quantitative luminescence analyses are also possible. The fibre structure of the fibre-optic plate (FOP), which is homogeneous over the entire field of view down to below 10 µm, allows equally good capture of the individual wells of different microtitre plates (MTP), for example 96-well and 384-well microtitre plates. As a result of the FOP having an optical "zero thickness" and the FOP moreover being able to cause mixing of the azimuth angles of incident rays, which is explained in more detail below, the optical lid thickness can be "zeroed" and the numerical aperture of the optical system, and hence its collection efficiency in relation to the sample luminescence, can be substantially increased. The FOP can also improve the crosstalk behaviour of the luminescence analysis. The apparatus according to the invention permits luminescence analyses independently of the fill level of single partial vessels of the microtitre plate.

A part of the apparatus according to the invention, specifically the fibre-optic plate, can be integrated in the lid or hot lid and can serve to cover a sample array for a luminescence analysis.

The apparatus according to the invention serves to analyse the luminescence of a plurality of samples. In the process, it is possible to analyse the luminescence radiation of the samples. The luminescence radiation can be a light radiation in the visible or in the infrared range. The apparatus according to the invention comprises a. at least one fibre-optic plate (abbreviated: FOP) having a lower side and an upper side opposite to the lower side, with each sample being assigned a plurality of fibres of the fibre-optic plate, with light radiation incident on the lower side being transmittable through the fibre-optic plate from the lower side to the upper side, b. at least one camera optical unit, c. at least one light-sensor array, with the respective sample, the fibre-optic plate, the camera optical unit and the light-sensor array being successively arranged in an observation beam path, with the lower side of the fibre-optic plate having a planar form and being arranged facing the samples. A planar form can mean: as a flat surface.

By way of example, luminescence can be understood to mean electroluminescence, chemiluminescence, candoluminescence, bioluminescence, cathodoluminescence, radioluminescence, ionoluminescence, photoluminescence, thermoluminescence, sonoluminescence, triboluminescence, fractoluminescence, lyoluminescence, crystalluminescence or piezoluminescence. In particular, the invention can be used to analyse the photoluminescence, in particular the fluorescence and/or phosphorescence, of samples.

The apparatus according to the invention can advantageously be used for quantitatively and/or simultaneously analysing luminescence of a plurality of samples. In this case, the intensities and/or the spectra of the luminescence radiation of the samples for example can be examined qualitatively and/or quantitatively.

The camera optical unit may comprise one or more lenses. The camera optical unit may comprise an objective or photographic objective. The camera optical unit may, but need not, moreover comprise a tube lens. Advantageously, the camera optical unit can have a telecentric design on the image side.

The fibre-optic plate may comprise a multiplicity of optical fibres, which may be designed as light-guiding fibres. The FOP may be covered with fibres over its entire area. The FOP may likewise advantageously have a segmented configuration. This may mean that only individual active points (segments) of the FOP are in each case equipped with a multiplicity of fibres while there are inactive points without fibres between the segments.

Expediently, the fibre-equipped active points may be arranged above the samples in the z-direction while the inactive points may be arranged in the regions between the samples. The fibres may be arranged in parallel with a fibre axis direction z. The lower side can be formed lying in a xy-plane normal to the fibre axis direction z. The x-, y- and z-directions can form a Cartesian coordinate system. The fibres can advantageously have a core diameter of 5 μm to 500 μm, particularly advantageously between 5 μm and 200 μm, very particularly advantageously between 5 μm and 50 μm. Advantageously, the FOP can be embodied such that each sample is assigned at least 10 individual fibres, particularly advantageously at least 100 individual fibres of the FOP. This can be understood to mean that the light of each sample is incident on the aforementioned number of fibres. As a result of the aforementioned embodiment of the FOP, the mixing of the azimuth angles of the light rays described below can work better in comparison with an embodiment with fewer assigned fibres per sample. The optical fibres of the FOP can each have two fibre end surfaces, specifically a first fibre end surface and a second fibre end surface. The first fibre end surfaces can be arranged on the lower side of the FOP. The second fibre end surfaces can be arranged on the upper side of the FOP. The optical fibres can extend advantageously in a straight line and advantageously in parallel to one another and, particularly advantageously, both in a straight line and in parallel to one another—for example in a fibre axis direction—from the lower side of the FOP to the upper side of the FOP. Thus, the fibres can each end at the lower side and at the upper side of the FOP. The FOP can be delimited by the first fibre end surfaces and the second fibre end surfaces. The optical fibres can be securely embedded in the FOP over their entire length.

Samples within the meaning of the present invention may comprise, e.g., plant, animal or eukaryotic cells or union of cells, cell organelles, for example chromosomes, viruses, bacteria, antibodies, pollen, sperm, macromolecules, for example proteins, and/or unions of molecules as examination objects. As examination objects, the samples may also comprise DNA, RNA or sections thereof. The aforementioned examination objects may be present in an aqueous suspension. The examination objects can be fluorescent and/or luminescent. Moreover, the samples may comprise markers, for example molecular markers, preferably fluorescing markers. Moreover, substances, preferably fluorescing substances, may be added to encode the samples, so as to be able to identify or distinguish between the respective samples.

The samples can emit light rays. In a manner equivalent to the aforementioned Cartesian coordinate system, it is possible to define a spherical coordinate system with a zenith direction z and an equatorial plane, i.e., a yx-plane, perpendicular thereto. In this case, the elevation angle of a light ray can be a difference of 90° minus the angle of inclination of the light ray in relation to the z-direction. The light ray may likewise have an azimuth angle in the spherical coordinate system, said azimuth angle being able to be defined relative to the x-axis. The optical axis may be aligned in the z-direction.

As is well known, an FOP is usually used in such a way that an object to be imaged is arranged directly at the light-entrance-side surface of the FOP. In contrast thereto, a respective distance a may be provided between the samples and the lower side of the FOP in the case of the present invention. This distance a may differ, for example as a consequence of different fill level of the wells with sample substances that are present in the sample receiving apparatus. However, the fill level may also be the same for all wells. By way of example, the fill level may be less than 90%, advantageously less than 70% and very particularly advantageously less than 60% of the volume of the wells. As a result, reagent consumption can be reduced and a PCR may possibly be carried out more quickly. It may even be possible to analyse samples that make up less than 10% of the volume of the well. The distance a can be considered to be the distance between the sample surface and the lower side of the FOP. By way of example, the distance a may be greater than 0.3 mm, advantageously greater than 0.5 mm, particularly advantageously greater than 1 mm and very particularly advantageously greater than 2 mm. It may even be possible to analyse samples whose surface has a distance a of more than 10 mm from the FOP. To accurately model the beam paths by means of ray tracing methods, the fact that the sample can also emit light from deeper regions of the sample model should be taken into account where necessary. This amplifies the effect described below. Just like light emission from deeper regions of the sample, the distance a may cause out-of-focus imaging of the sample on the light-sensor array. While an object directly adjacent to the lower side of the FOP would be imaged in focus on the upper side of the plate, an object arranged a distance from the FOP already will not produce a sharp image representation on the upper side of the FOP. Every divergent ray bundle emanating from a location in the sample is therefore able to illuminate the location of the FOP situated above the respective well over its entire area and can be guided through the FOP in the z-direction to the upper side of the FOP. Moreover, the azimuth angle of the input radiation may be lost during the passage through the FOP, but the elevation angle may be maintained. As a result, the light radiation emanating from the upper side may firstly be homogenized in respect of the emission direction and secondly be averaged over a sample volume in each case, with the light radiations emanating from adjacent sample volumes being able to be present on the upper side not in superposed fashion but separately from one another. If the upper side of the plate is now imaged onto the light-sensor array by means of the camera optical unit, the radiations of the individual sample volumes can be separated from one another and, at the same time, be detected in a manner averaged over a sample volume in each case. As a result, there can also be a good evaluation of the samples furthest away from the optical axis without having to use a telecentric optical unit or a scanner. As a result of averaging the light radiation over a sample volume in each case, an economical image sensor with a low resolution and a low sensitivity may moreover be sufficient. The light-sensor array plane and the upper side of the FOP can be conjugate planes. The conjugation can be defined in relation to the camera optical unit, optionally in conjunction with a possibly provided field lens or converging lens arranged in the vicinity of the upper side of the FOP.

The provision of a distance a between the sample surface and the FOP can moreover be advantageous in that a contamination of the FOP by the samples is able to be avoided.

Advantageously, the apparatus can moreover comprise at least one heating device for heating the fibre-optic plate. This can ensure that no liquid contained in the sample, for example water, evaporates and is able to condense on the fibre-optic plate or the sealing film of the sample. Should the FOP have inactive locations, the heating device can be in the form of, e.g., at least one heating wire and/or an electrically heatable layer, which is arranged at the inactive locations. The locations above the samples, where light should be passed through the FOP, can be free from the heating device. This may be advantageous in that more used light is available for detection purposes.

The samples can advantageously be arranged in at least one sample receiving apparatus. The sample receiving apparatus may have a plurality of separated wells for accommodating the samples. The samples can be arranged in an xy-plane. The sample receiving apparatus may have a plate-shaped form. The sample receiving apparatus may have a plate normal which may be arranged in the z-direction. The sample receiving apparatus can be in the form of a titre plate (well plate), for example a microtitre plate (micro well plate). The wells may have light-reflecting walls. To this end, the walls of the wells may have a light-reflecting coating. As a result of this measure, it is possible to better exploit the excitation light and/or the light radiation of the luminescence of the samples to be detected.

Advantageously, the lower side of the fibre-optic plate can be arranged so as to lie on the sample receiving apparatus. Advantageously, the fibre-optic plate can seal the wells. Alternatively, the wells can also be covered and/or sealed by means of a transparent (sealing) film. Then, the fibre-optic plate can be placed on the film. Advantageously, the film can have an electrically heatable embodiment, for example as an electrically conductive film. Advantageous, each sample in the respective well can have a fill level.

Advantageously, the fill level can be less than full to the brim, advantageously less than 80% of the maximum fill level, particularly advantageously less than 50%. Advantageously, this can avoid contamination of the cover of the microtitre plate or of the fibre-optic plate. The samples can be arranged at a certain distance from the FOP. The FOP can cause the azimuth angles of the incident radiation to be mixed while the elevation angles are maintained. As a result, there can be homogenization of the light radiation respectively emanating from a sample without this causing additional crosstalk of the respective light radiation into the light path of an adjacent sample. This can simplify the fluorescence analysis, in particular a quantitative fluorescence analysis averaged over the respective sample volume.

Advantageously, a transparent protective layer can be arranged on the lower side of the fibre-optic plate.

Advantageously, the heating device can be formed as an electrically conductive transparent layer on the lower side and/or the upper side of the fibre-optic plate. Then, the FOP can have an electrically heatable embodiment. By way of example, the electrically conductive transparent layer may comprise an indium tin oxide layer or a conductive polymer layer.

The heating device may also comprise heating wires. The heating device can also be embodied such that the edges of the FOP are heatable and the FOP can be heated starting from the edge.

Likewise advantageously, the heating device can be embodied as an infrared emitter directed at the fibre-optic plate. Likewise advantageously, the FOP can be heated by means of input coupled ultrasound which is absorbed in the plate.

Advantageously, the upper side of the fibre-optic plate can have a convex embodiment. This may mean that the FOP is thicker in the middle than at the edge. Advantageously, the normals of the fibre end surfaces situated on the upper side of the fibre-optic plate may each have an inclination in relation to the fibre axis z. Advantageously, this inclination may be zero for a central region of the FOP and may increase towards the outside. Alternatively, this can be achieved by means of a Fresnel-like structure of the upper side of the fibre-optic plate. This can cause the exit-side ray bundles (in relation to the FOP), vis-à-vis the entrance-side ray bundles, to be able to be tilted in the direction of the camera optical unit. This can achieve an even more uniform brightness distribution on the light-sensor array and/or can allow a reduction in the distance between the camera optical unit and the upper side of the FOP.

Advantageously, a converging lens can be arranged between the upper side of the fibre-optic plate and the camera optical unit. The converging lens can be in the form of a spherical lens. The converging lens can have a plano-convex embodiment. The converging lens can be arranged directly on the upper side of the FOP. It can be embodied as a Fresnel lens.

A first microlens array and a second microlens array can be arranged between the upper side of the fibre-optic plate and the camera optical unit. The second microlenses of the second microlens array may have a spatially dependent offset $v(x,y)$ in relation to the first microlenses of the first microlens array. The offset may be zero in a central region and may continuously increase or continuously decrease with the distance from the central region. In this way, a ray deflection can be brought about preferably in the direction of the camera optical unit.

The microlens arrays may contain anamorphic microlenses. Moreover, the lens arrays can be used for the illumination or luminescence excitation in particular.

Advantageously, the apparatus may moreover comprise at least one excitation light source for producing at least one excitation light. The excitation light may be provided for exciting a fluorescence radiation and/or a phosphorescence radiation in the sample. The excitation light emanating from the excitation light source can be able to be input coupled into the fibre-optic plate at the upper side. The samples can be excitable using the component of the excitation light emerging from the lower side of the fibre-optic plate. In this case, a fluorescence radiation that can be detected using the light sensor array may arise in the samples. The excitation light can advantageously be input coupled into the beam path, for example between the light-sensor array and the camera optical unit or between the objective and the tube lens of the camera optical unit or between the camera optical unit and the FOP, by means of a beam splitter in the form of a dichroic mirror or a polarization beam splitter.

The light-sensor array can be in the form of an image sensor, for example a CCD or CMOS matrix sensor. The light-sensor array can also be in the form of a photodiode array. The light-sensor array can advantageously have a wavelength-sensitive embodiment. The light-sensor array can be provided for quantitative and/or qualitative detection of the fluorescence radiation emanating from each sample.

A method according to the invention for analysing luminescence of a plurality of samples comprises the following steps
a. arranging the samples in a slab-shaped sample receiving device which has a plurality of separated wells for accommodating the samples,
b. emitting luminescence radiation of at least one of the samples,
c. passing at least some of the luminescence radiation through a fibre-optic plate from the lower side to an upper side of same, each of the samples being assigned a plurality of fibres of the fibre-optic plate,
d. guiding the luminescence radiation through a camera optical unit,
e. recording the luminescence radiation incident on a light-sensor array, with each of the samples being able to be assigned a spectral distribution and/or an intensity, averaged over the sample, of the luminescence radiation,
with the luminescence radiation emanating from a respective sample being at least partly homogenized prior to the incidence on the light-sensor array.

Advantageously, the method can moreover comprise:
f. heating the fibre-optic plate to a temperature of a lower side of the fibre-optic plate which is equal to or higher than a sample temperature.

The emission of a luminescence radiation of at least one of the samples can be implemented in at least one spectral range. However, it may also be implemented in a plurality of spectral ranges.

Advantageously, the method and/or the apparatus can be used for an analysis of the course and/or the result of a polymerase chain reaction (PCR). A use can likewise be advantageous for a restriction fragment length polymorphism analysis, a SCCP (single strand confirmation polymorphism) analysis, a temperature gradient gel electrophoresis analysis, DNA sequencing or phospholipid analysis.

The entrance-side numerical aperture of the camera optical unit can be greater than 0.05, advantageously greater than 0.08 and particularly advantageously greater than 0.12 and very particularly advantageously greater than 0.13. This can realize a short beam path, allowing the structural dimension of the apparatus to be reduced. Thus, for example, the distance between the upper side of the FOP and the light-sensor array can be less than 500 mm, advantageously less than 400 mm, particularly advantageously less than 350 mm and very particularly advantageously less than 300 mm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The invention will be explained below with reference to exemplary embodiments.

Figure 1:
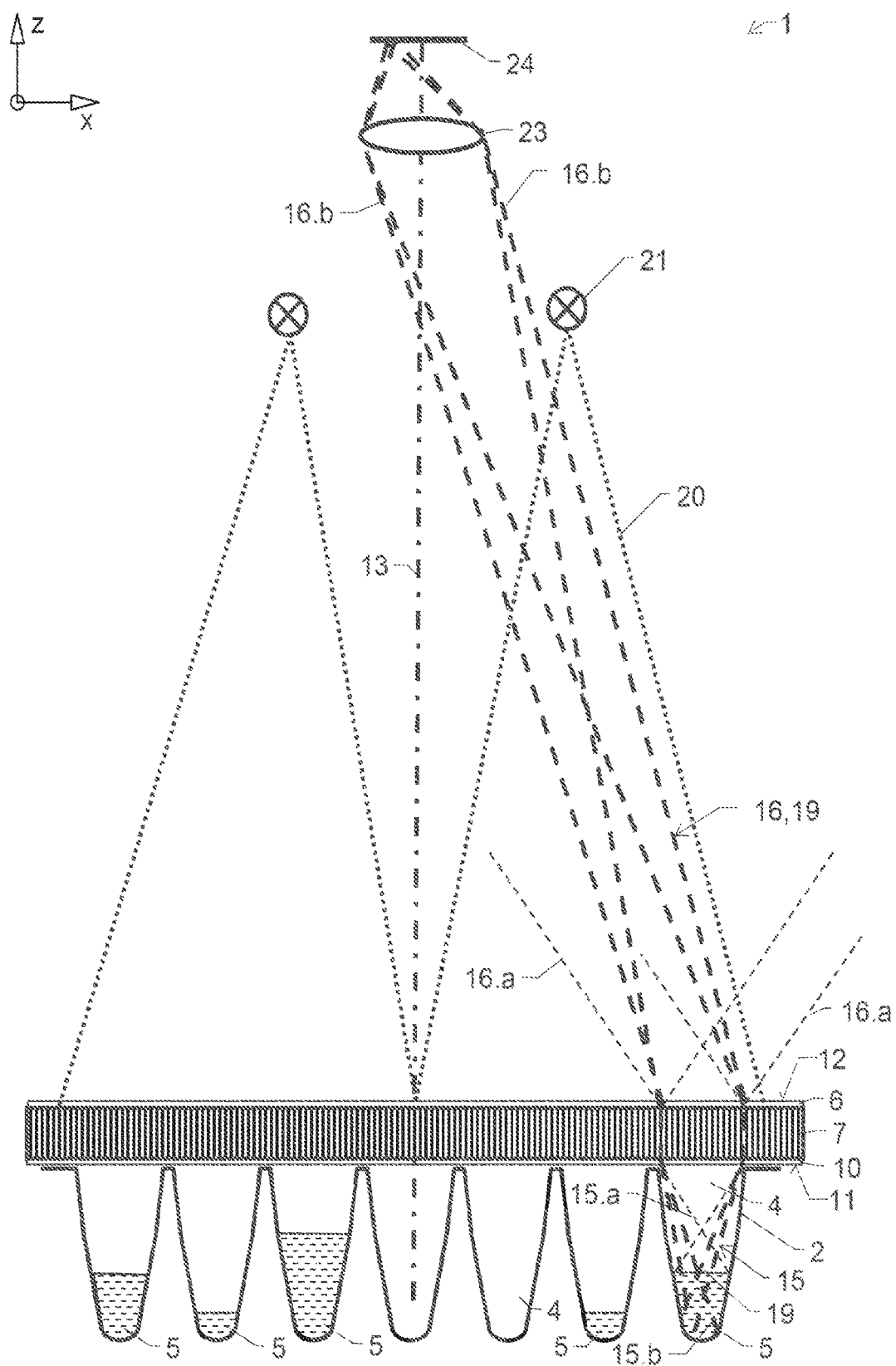
FIG. 1 shows a first exemplary embodiment.

FIG. 1 shows a first exemplary embodiment. An apparatus 1 for simultaneously analysing luminescence of a plurality of samples 5 is depicted. The apparatus comprises a fibre-optic plate 7. The latter has a lower side 11 and an upper side 12 opposite to the lower side. Each sample is assigned a plurality of fibres of the fibre-optic plate 7. Light radiation 15 incident on the lower side is passed through the fibre-optic plate from the lower side to the upper side and leaves the latter as a ray bundle 16. A part thereof is captured as light radiation 19 by a camera optical unit 23 and is supplied to a light-sensor array 24 for detection purposes. The camera optical unit is only depicted symbolically here. In practice, use will usually be made of multi-lens objectives or combinations of objective and tube lens (not depicted in the figure).

Wells 4 serving to accommodate sample substances 5 are present in a sample receiving apparatus 2. Individual wells may be empty. However, from an efficiency point of view, it is better if all available wells are used.

The sample 5, the fibre-optic plate 7, the camera optical unit 23 and the light-sensor array 24 are successively arranged in an observation beam path. For the sake of clarity, the observation beam path is only depicted in exemplary fashion for one of the samples in the figures. The lower side 11 of the fibre-optic plate 7 has a planar form and is arranged facing the samples 5. A respective distance is present between the samples 5 and the lower side 11 of the FOP. This distance may differ in the case of different fill level of the wells 4 with sample substances 5 that are present in the sample receiving apparatus 2. However, the fill level may also be the same for all wells. The distance can be considered to be the distance between the sample surface and the lower side. When considered in more detail, the fact that the sample can also emit light from deeper regions of the sample volume could be taken into account. Then, the centroid of the luminous power formed over the sample volume could be chosen as the distance reference. However, to understand the principle of the invention, it is sufficient to choose the sample surface as distance reference.

Every divergent ray bundle 15 emanating from a location in the sample 5 illuminates the location of the FOP 7 situated above the respective well over its entire area and is guided through the FOP in the z-direction to the upper side 12. Moreover, the azimuth angle of the input radiation is lost during the passage through the FOP, but the elevation angle is maintained: As a result, the light radiation 16 emanating from the upper side firstly is homogenized in respect of the emission direction and secondly is averaged over a sample volume in each case, with the light radiations emanating from the individual sample volumes not being superposed on the upper side but being separate from one another. If the upper side of the plate is now imaged onto the light-sensor array 24 by means of the camera optical unit 23, the radiations of the individual sample volumes remain separated from one another but are averaged over a sample volume in each case.

As a result, there can also be a good evaluation of the samples furthest away from the optical axis 13 without having to use a telecentric objective or a scanner.

In FIG. 1, marginal rays 15.a emanating from a location of the sample are plotted, which marginal rays are incident on the FOP and respectively leave the latter as first rays 16.a of an exit-side ray bundle 16. In this case, a conical shell-shaped exit-side ray bundle 16 can be assigned to each entrance-side ray 15, as explained below in FIG. 7 and the associated description.

Moreover, used rays 16.b of exit-side ray bundles 16 of the light radiation 19 are plotted. The used rays 16.b arrive at the light-sensor array while the rays located outside of the used ray bundle are not captured by the light-sensor array. The used rays can be traced back. In the process, it is possible to determine incident rays 15.b which are partly converted into the used rays 16.b by the FOP. These incident rays 15.b come from different regions of the sample, with the entire sample volume being able to contribute to the used light in this case. Shadowing of certain regions of the sample can be avoided as a result of the effect of the FOP. In practical terms, rays can emanate in each direction from every location in the sample. In this case, some of the rays of a sample can always be incident on the light-sensor array at a specific location. This location on the light-sensor array may have a certain extent, but it is delimited from the location of the point of incidence of the rays of adjacent samples.

The marginal rays are depicted as thin lines while the used rays are depicted as thick lines.

The solution according to the invention can facilitate at least doubling of the numerical aperture (NA=0.03 instead of 0.014) of the camera optical unit in comparison with the prior art (e.g., EP1681556B1). As a result, the collection efficiency of the camera optical unit for the luminescence radiation to be analysed can be increased fourfold and the corresponding detection limits and signal-to-noise ratio can be significantly improved. Moreover, the optical system can have a significantly smaller embodiment. For example, the object-image distance (distance between the upper side 12 of the FOP 7 and the light-sensor array 24 in FIG. 1) can thus be reduced from 800 mm (as in EP1681556B1) to approximately 280 mm. It should be observed that the figures are not drawn true to scale.

Moreover, one or more excitation light sources 21 may be provided in order to provide an excitation light 20. This excitation light can be passed through the FOP to the samples from above, i.e., counter to the light radiation 19 to be analysed. By way of example, a fluorescence radiation of the samples can be excited using the excitation light 20.

Moreover, the apparatus 1 comprises a heating device 6 for heating the fibre-optic plate 7. It is embodied as an electrically conductive transparent layer, which can be heated by means of an electric current.

The lower side 11 of the fibre-optic plate is provided with a transparent protective layer 10 and arranged so as to rest on the sample-receiving apparatus 2.

Figure 8:
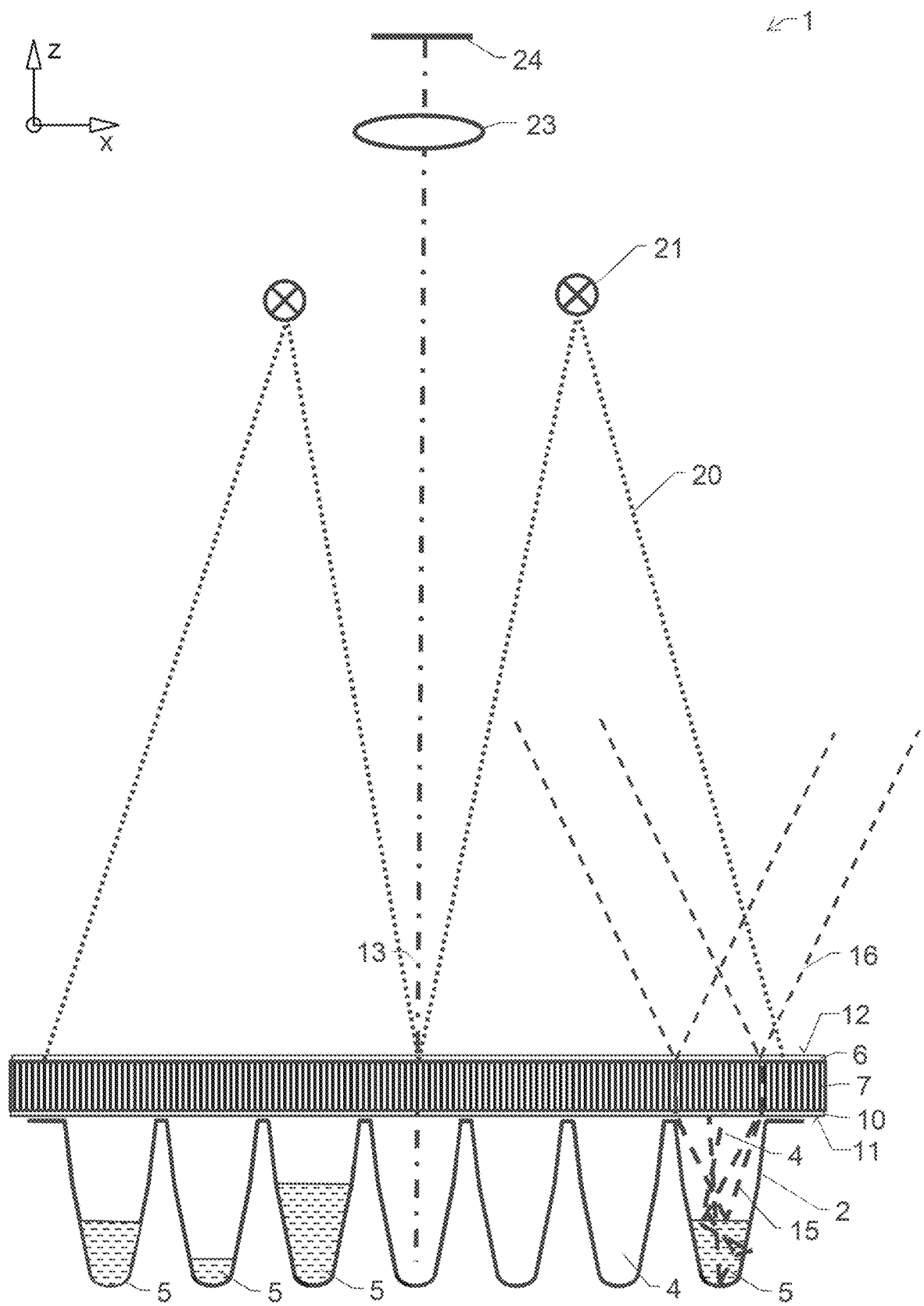
FIG. 8 shows a further representation of the first exemplary embodiment, in which the sample wells are situated within a reflecting receptacle.

FIG. 8 shows a further representation of the first exemplary embodiment, in which the sample wells are situated within a reflecting receptacle. For the sake of clarity, only two marginal rays are depicted in exemplary fashion. These each leave the FOP as an exit-side conical shell-shaped ray bundle 16. Light rays 15 emanating from a plurality of locations in the sample are depicted on the entrance side. A plurality of the rays can reach the light-sensor array as a consequence of the effect of the FOP. The sample can emit light in each direction from each location. Consequently, light from each location in the sample will be incident on the sensor array, and so a value of the light radiation averaged over the respective sample can be measured. More luminescence light of the sample can be used as a result of the reflecting walls of the well. Moreover, the entire sample volume can contribute better to the used light.

Figure 2:
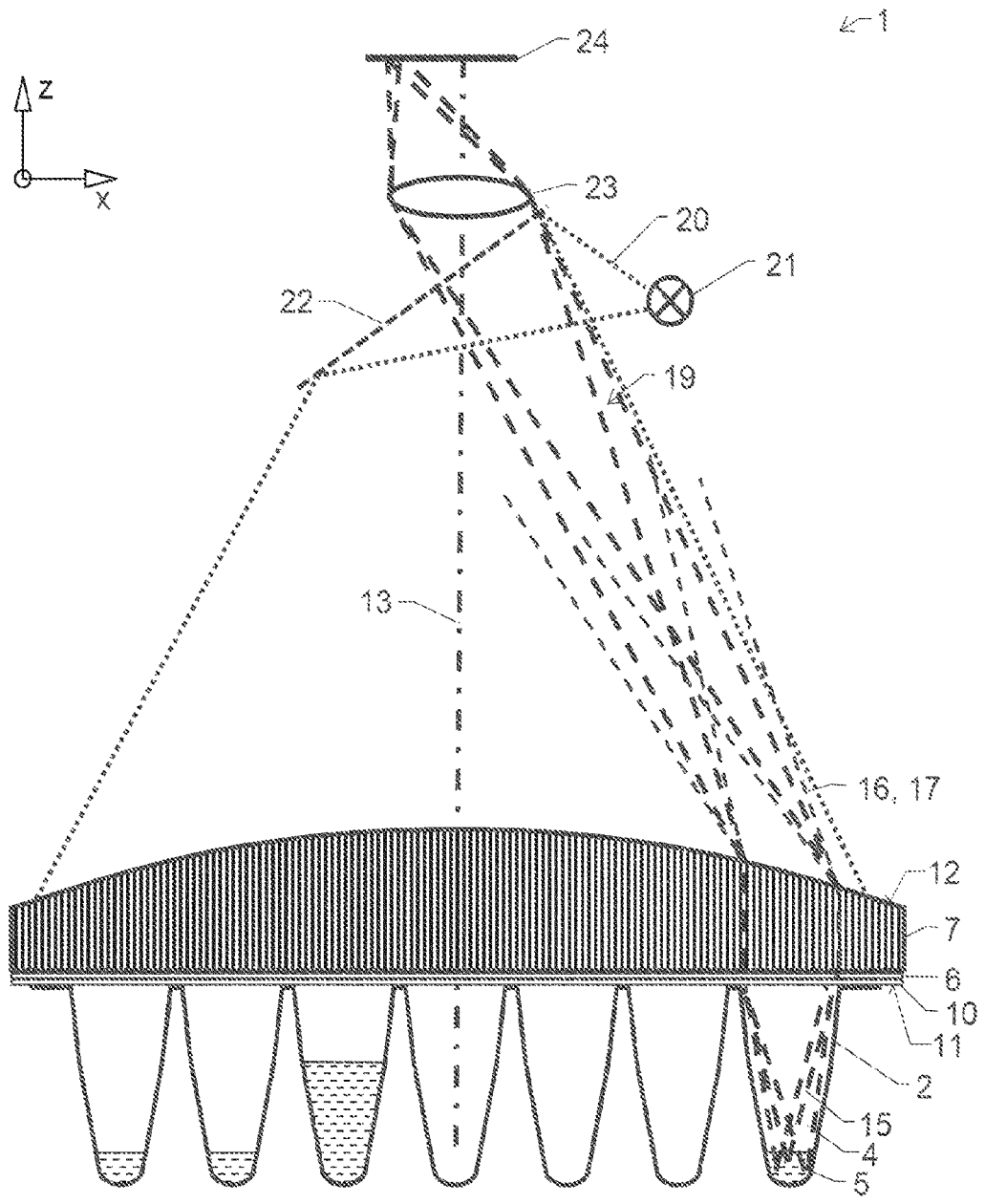
FIG. 2 shows a second exemplary embodiment.

FIG. 2 shows a second exemplary embodiment. The upper side 12 of the fibre-optic plate 7 has a convex form in this example. This causes the exit-side ray bundles 14 to be tilted in the direction of the camera optical unit 23 vis-à-vis the entrance-side ray bundles 15. This can achieve an even more uniform brightness distribution on the light-sensor array and can allow a reduction in the distance between the camera optical unit and the upper side of the FOP.

The excitation light 20 is input coupled into the beam path by means of a beam splitter 22 in the form of a dichroic mirror or in the form of a polarization beam splitter.

Figure 3:
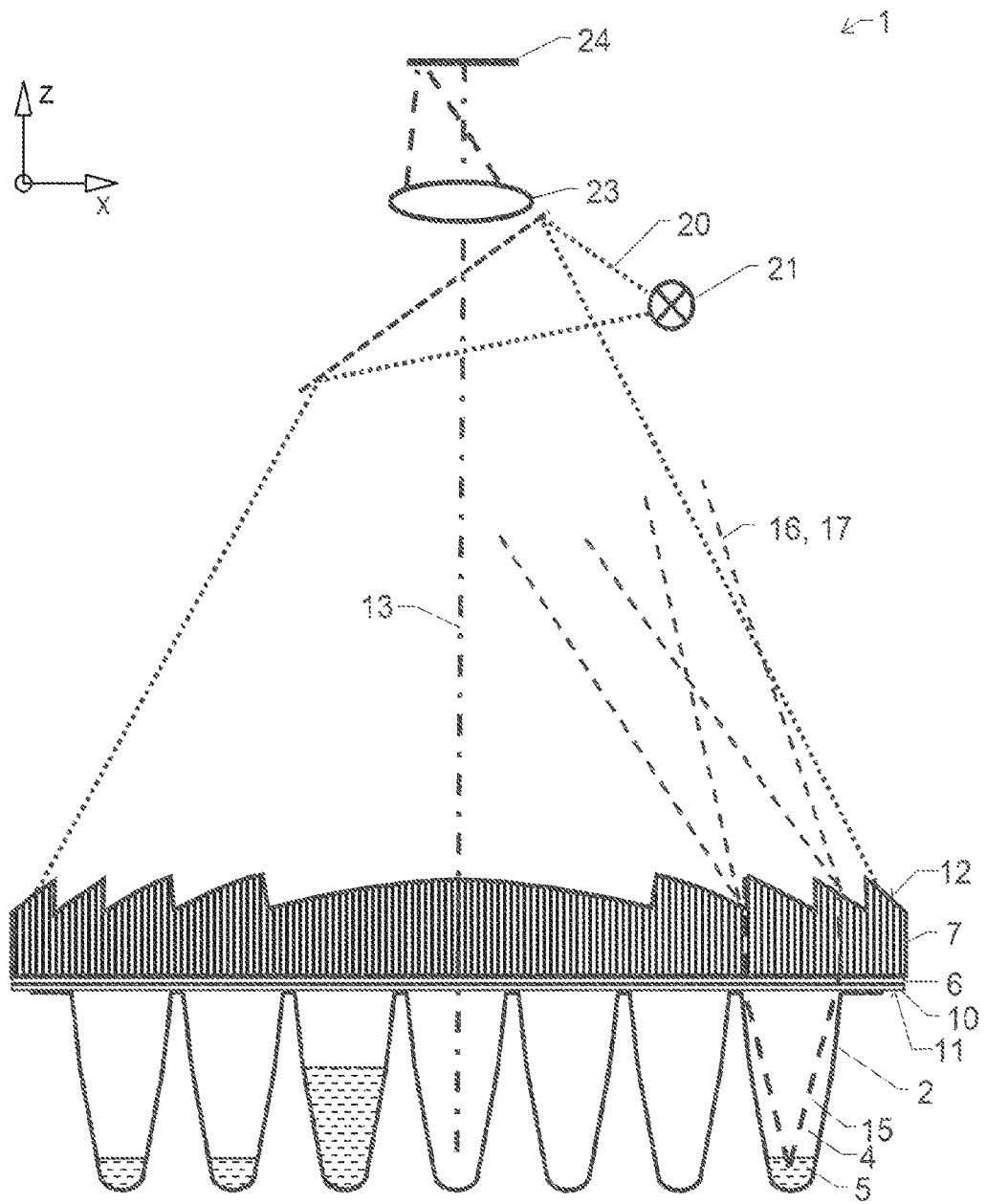
FIG. 3 shows a third exemplary embodiment.

FIG. 3 shows a third exemplary embodiment. In this case, the upper side 12 of the FOP 7 has a convex embodiment with Fresnel steps. In this case, the term convex relates to the optical power.

Figure 4:
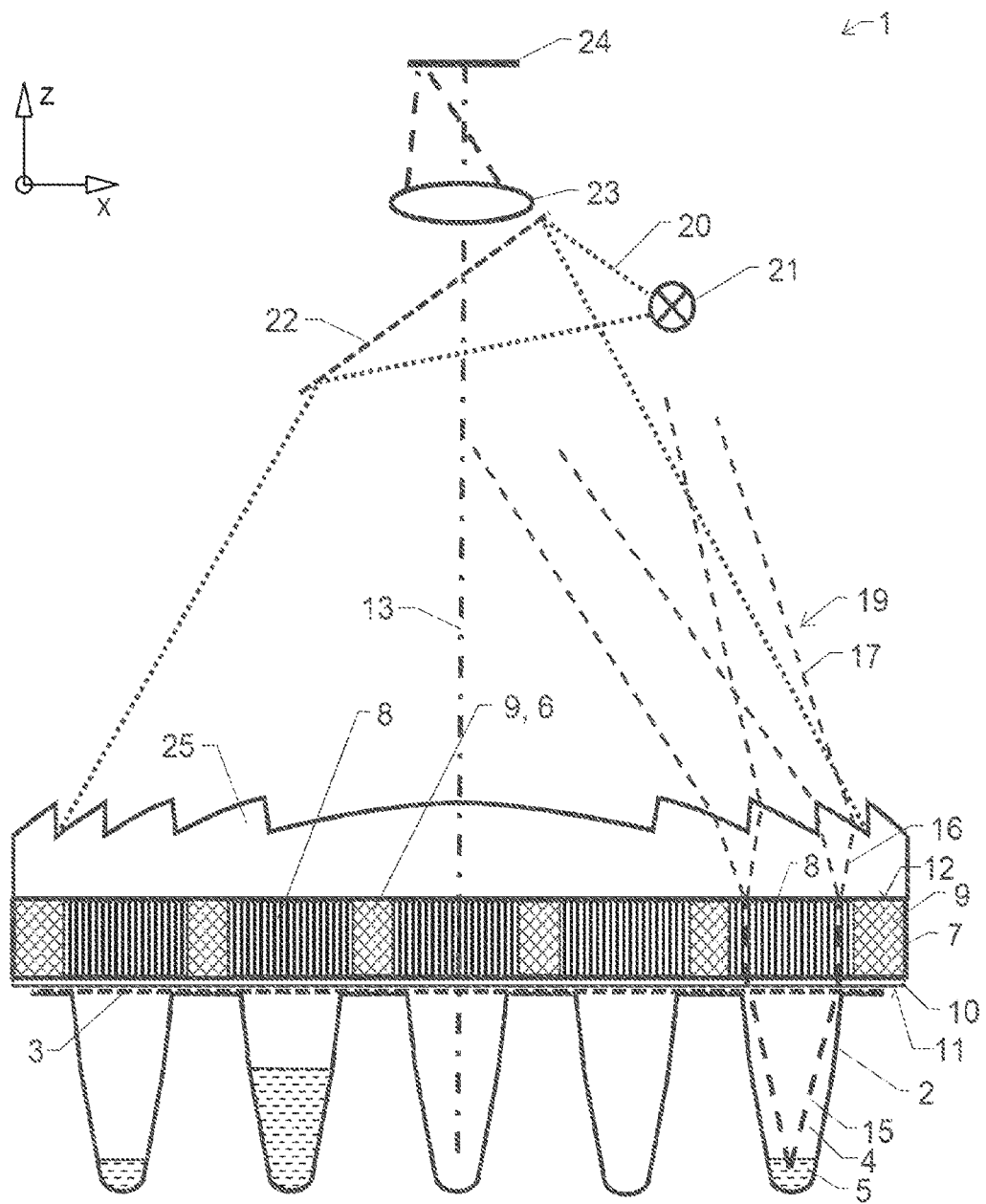
FIG. 4 shows a fourth exemplary embodiment.

FIG. 4 shows a fourth exemplary embodiment. In this case, a converging lens 25 is arranged between the upper side of the fibre-optic plate and the camera optical unit. It is in the form of a Fresnel lens. The FOP 7 has a segmented design in this exemplary embodiment. The active locations 8 comprise fibres which pass the light. The inactive locations 9 have no fibres and comprise a matrix material, for example an artificial resin, which encloses the active locations. The inactive locations may comprise heating wires (not depicted) and/or electrically conductive layers (not depicted) as an ohmic heating device.

The wells 4 of the sample-receiving apparatus 2 are sealed by a film 3.

Figure 5:
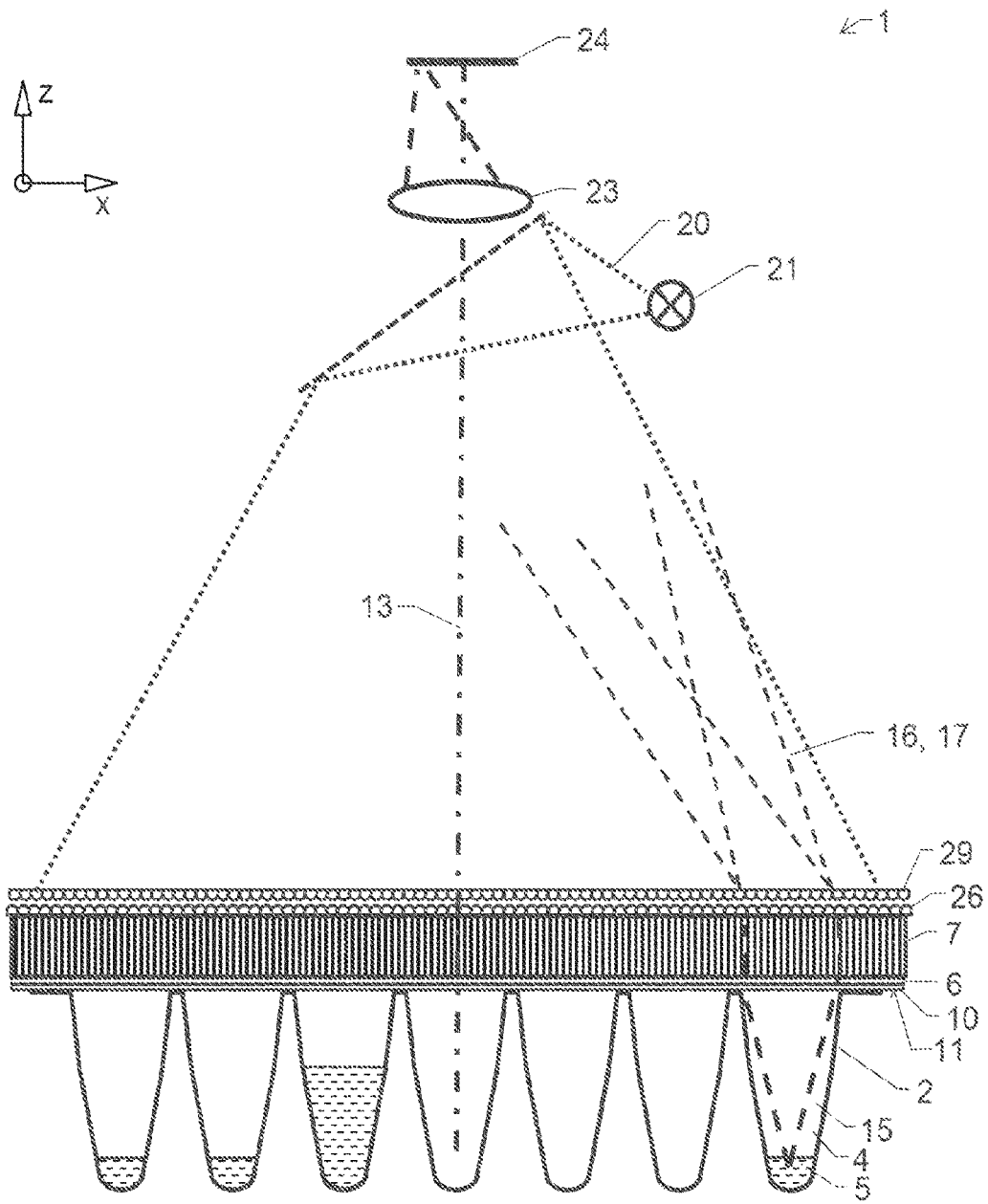
FIG. 5 shows a fifth exemplary embodiment.

FIG. 5 shows a fifth exemplary embodiment. A first microlens array 26 and a second microlens array 29 are provided.

Figure 6:
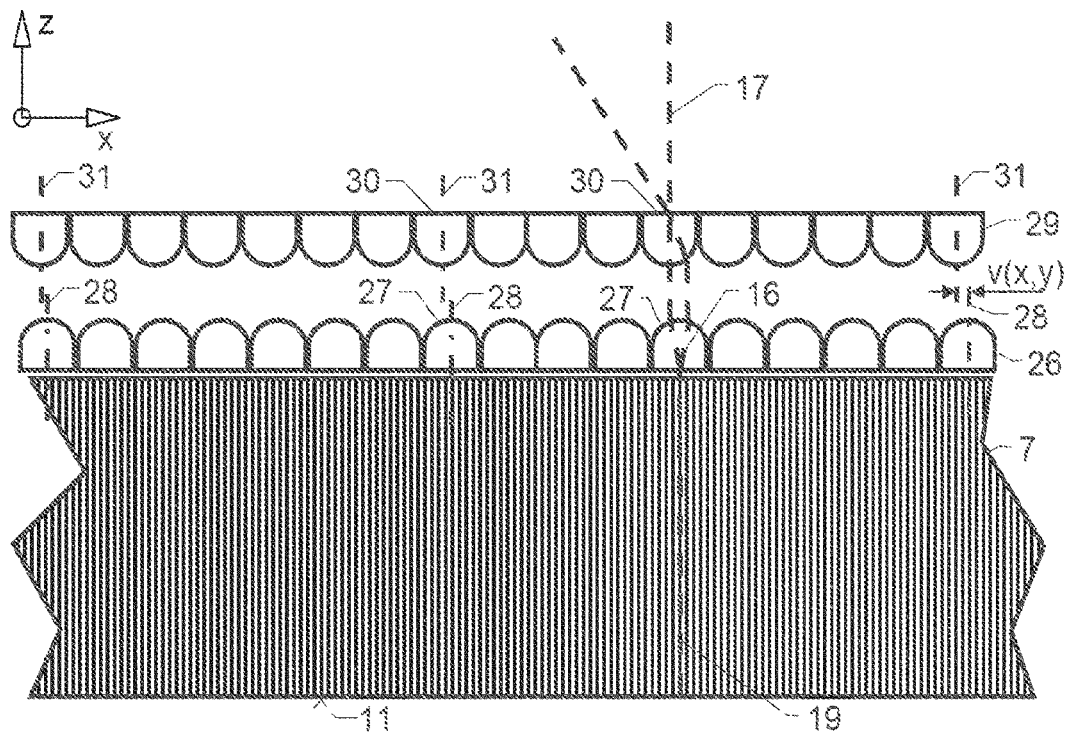
FIG. 6 shows a detail from the fifth exemplary embodiment.

FIG. 6 shows a detail from the fifth exemplary embodiment. The first microlens array 26 and the second microlens array 29 are arranged as a 2f system. In each case, a first microlens 27 and an assigned second microlens 30 form a telescope in each case. In this case, the second optical axis 31 of the second lens 30 has an offset v(x,y), depicted here as an x-offset, with respect to the first optical axis 28 of the assigned first lens 27. This leads to a tilt of a ray bundle 16 emerging from the FOP to form a tilted ray bundle 17. In this example, the offset of the second optical axis 31 in relation to the first optical axis 28 has a spatial dependence. The offset optical axes are depicted in exemplary fashion at three locations. In relation to the optical axis (13 in FIG. 5) of the overall system, rays 19 situated further to the outside are tilted more strongly in this case.

Figure 7:
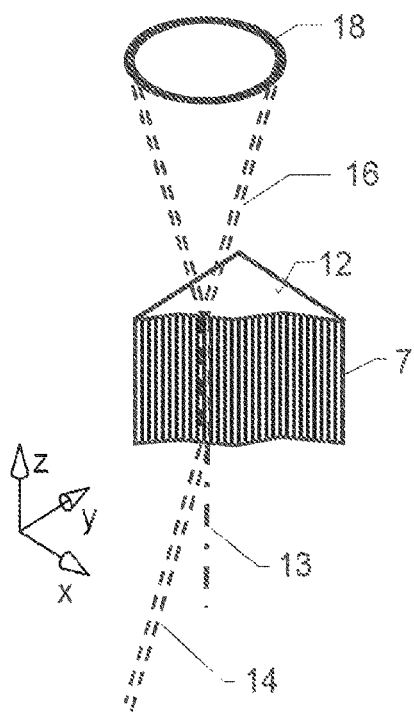
FIG. 7 shows the effect of an FOP.

FIG. 7 shows the effect of an FOP. This theoretical sixth example for elucidating the principle of action depicts a narrow parallel ray bundle 14, which is incident on the lower side of an FOP 7 at a certain elevation angle and a certain azimuth angle. The zenith is the optical axis 13, which runs in the z-direction. The parallel ray bundle 14 is inclined in relation to the optical axis. On account of the light-guiding effect of the FOP with fibres arranged in the z-direction, the ray bundle is passed perpendicular to the upper side 12 of the FOP. The ray bundle emerges on the upper side, with the elevation angle of each ray being maintained but with the azimuth angles of the individual rays being statistically distributed, ideally with a uniform distribution. As a result, a conical shell-shaped divergent ray bundle 16 arises on the light-exit side. In theory, an annular light distribution 18 can be observed in an xy-plane at a sufficiently large distance, the diameter of said light distribution depending on the elevation angle of the incident ray bundle. For better visibility of the light rays, the FOP 7 is depicted in broken-out form in the illustration In fact, a sample does not only emit a parallel ray bundle; instead, a statistical distribution of elevation angles, possibly a uniform distribution or a Lambertian distribution, is present in the light radiation from the sample. Therefore, the emergent diverging ray bundle will not be conical shell-shaped in practice but may have a conical form. In this case, the azimuth angles are mixed for each individual ray direction.

Figure 9:
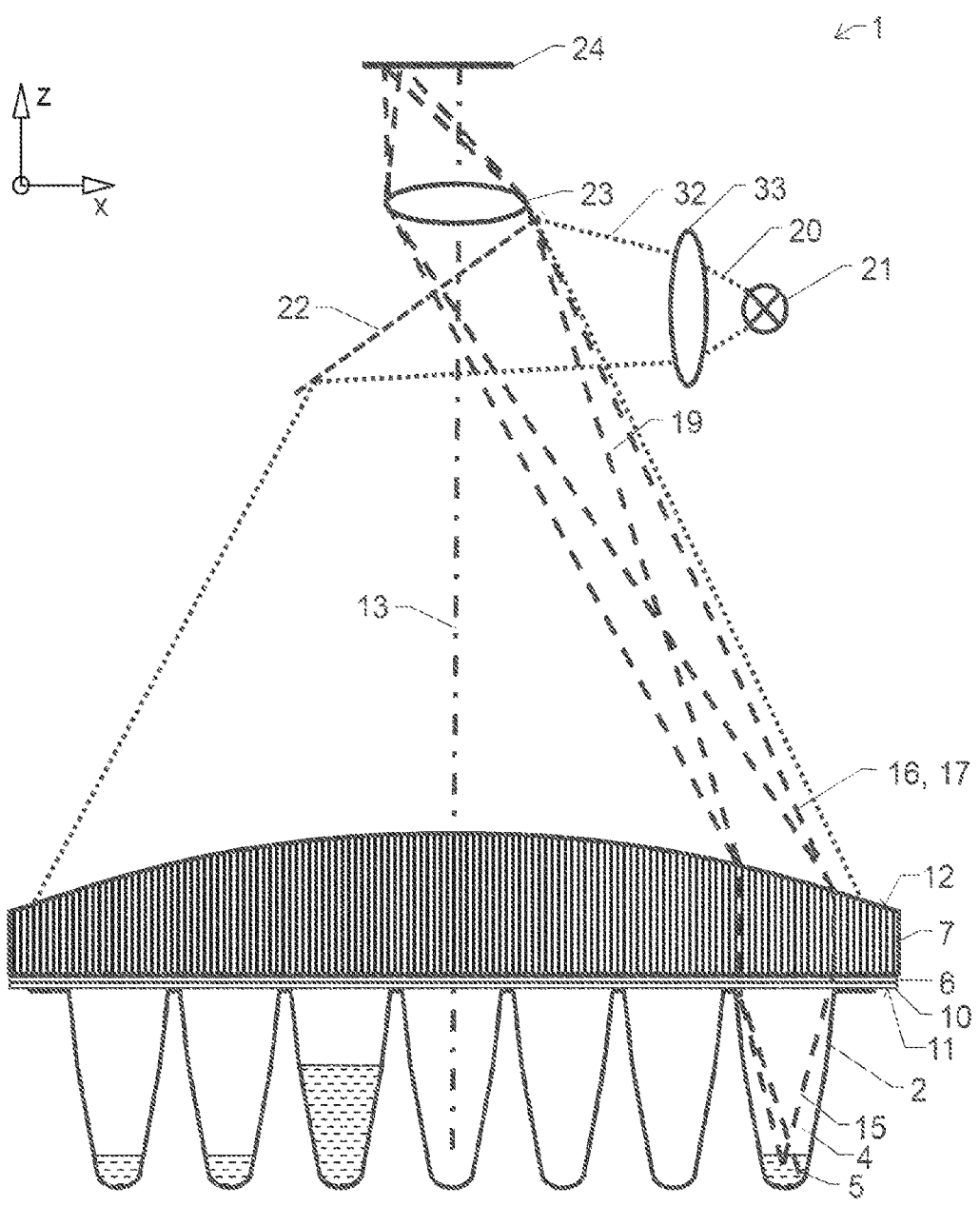
FIG. 9 shows an illumination option.

FIG. 9 shows a seventh exemplary embodiment for excitation light sources with a light-condenser objective 33, as may advantageously be used in the above-described exemplary embodiments in place of the excitation light sources depicted there. By way of example, the light-condenser objective can be embodied as a lens array, which is also known as a fly's eye array. The fly's eye array is a two-dimensional array of individual optical elements which are combined or formed into a single optical element and which are used to convert light spatially from a non-uniform distribution 20 into a uniform distribution 32 in an illumination plane. The surface shape of the optical elements can be spherical or anamorphic. A second lens array, which is also known as a field array, improves the uniformness of the illumination uniformity and is determined by the number of the channels or of the lens array, with a greater number of elements leading to a more uniform uniformity. The distance between the length array depends on the focal length of the lens elements. The focal length, the size and the distance of the two arrays determine the dimension of the illumination plane with a certain magnification. The excitation light 20 is input coupled into the beam path by means of a beam splitter 22 in the form of a dichroic mirror.

Figure 10:
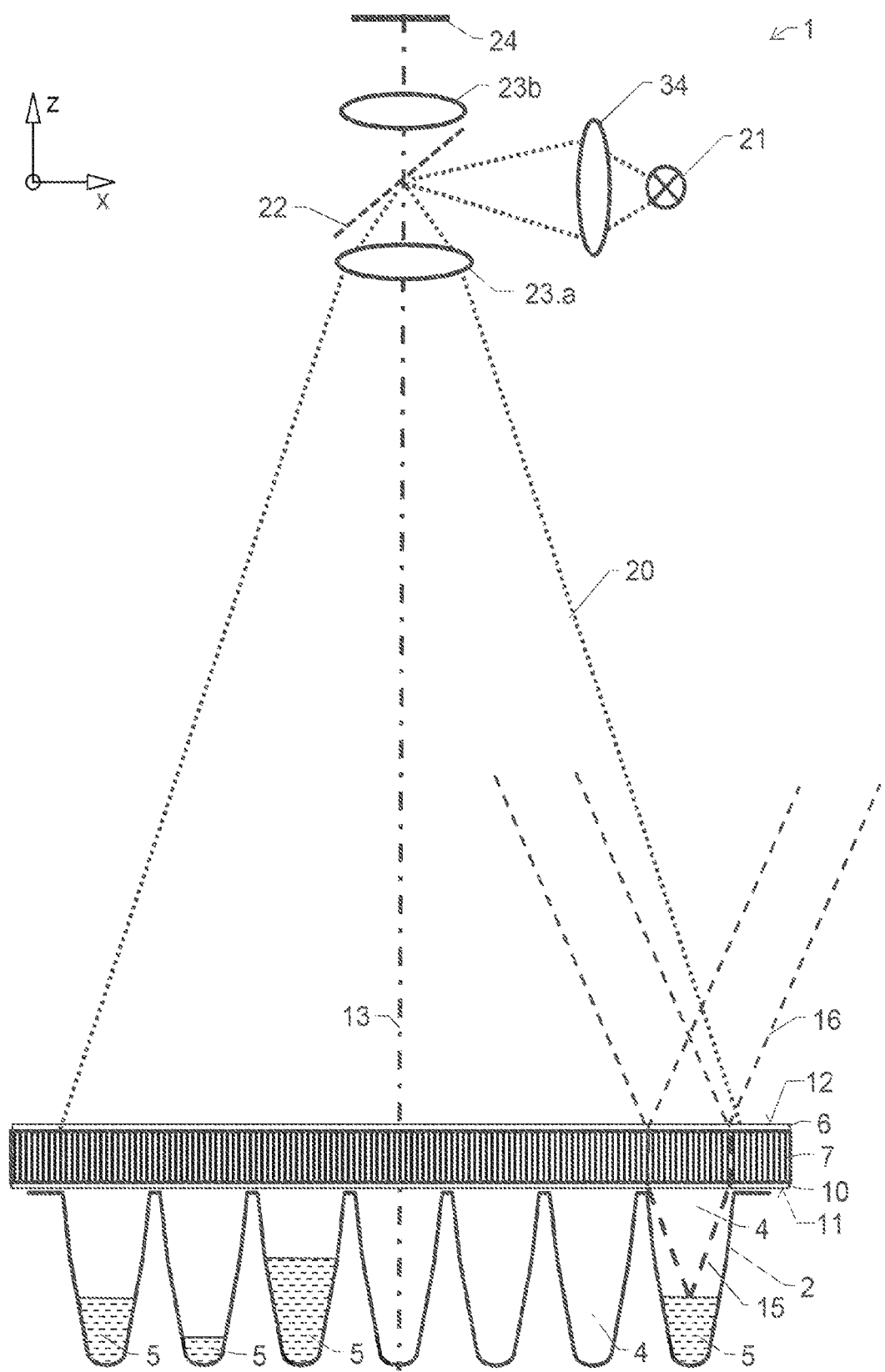
FIG. 10 shows a further illumination option through the objective.

FIG. 10 shows an eighth exemplary embodiment for the input coupling of an excitation light source, as may advantageously be used in the above-described exemplary embodiments in place of the excitation light sources depicted there. In this case, the illumination light or excitation light is input coupled through an illumination optical unit 34 and a dichroic beam splitter 22 or a polarization beam splitter into the beam path between the objective 23a and the tube lens 23b in order to illuminate the samples.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for analysing luminescence of a plurality of samples, comprising a. at least one fibre-optic plate having a lower side and an upper side opposite to the lower side, with each sample being assigned a plurality of fibres of the fibre-optic plate, with light radiation incident on the lower side being transmittable through the fibre-optic plate from the lower side to the upper side;
  b. at least one camera optical unit; and
  c. at least one light-sensor array, with the sample, the fibre-optic plate, the camera optical unit and the light-sensor array being successively arranged in an observation beam path, with the lower side of the fibre-optic plate having a planar form and being arranged facing the samples,
    wherein the samples are arranged in at least one sample receiving apparatus, which has a plurality of separated wells for accommodating the samples, and
    wherein the lower side of the fibre-optic plate is arranged so as to lie on the sample receiving apparatus.

2. The apparatus according to claim 1, for quantitative luminescence analysis.

3. The apparatus according to claim 1, wherein a respective distance is provided between the samples and the lower side of the fibre-optic plate.

4. The apparatus according to claim 1, wherein the fibre-optic plate has a segmented form.

5. The apparatus according to claim 1, moreover comprising at least one heating apparatus for heating the fibre-optic plate.

6. The apparatus according to claim 1, wherein a transparent protective layer is arranged on the lower side of the fibre-optic plate.

7. The apparatus according to claim 1, wherein a heating apparatus is in the form of an electrically conductive transparent layer on the lower side and/or the upper side of the fibre-optic plate or in the form of an infrared emitter directed at the fibre-optic plate.

8. The apparatus according to claim 1, wherein the upper side of the fibre-optic plate has a convex form.

9. The apparatus according to claim 1, wherein a converging lens is arranged between the upper side of the fibre-optic plate and the camera optical unit.

10. The apparatus according to claim 1, wherein a first microlens array and a second microlens array are arranged between the upper side of the fibre-optic plate and the camera optical unit, and the second microlenses of the second microlens array have a spatially dependent offset v (x,y) in relation to the first microlenses of the first microlens array.

11. The apparatus according to claim 1, wherein provision is moreover made of at least one excitation light source for producing at least one excitation light for exciting a fluorescence radiation and/or a phosphorescence radiation in the sample, and the excitation light emanating from the excitation light source is able to be input coupled into the fibre-optic plate at the upper side and the samples are able to be excited using the component of the excitation light emerging from the lower side of the fibre-optic plate.

12. The apparatus according to claim 1, wherein optical fibres of the fibre-optic plate each have two fibre end surfaces, namely a first fibre end surface and a second fibre end surface wherein the first fibre end surfaces are arranged on the lower side of the fibre-optic plate and the second fibre end surfaces are arranged on the upper side of the fibre-optic plate.

13. The apparatus according to claim 12, wherein and optical fibres extends both in a straight line and in parallel to one another from the lower side of the fibre-optic plate to the upper side of the fibre-optic plate.

14. The apparatus according to claim 1, wherein optical fibres of the fibre-optic plate are securely embedded in the fibre-optic plate over their entire length.

15. A method for analysing luminescence of a plurality of samples, comprising
arranging the samples in a slab-shaped sample receiving device apparatus which has a plurality of separated wells for accommodating the samples,
emitting luminescence radiation of at least one of the samples,
arranging a fibre-optic plate so as to lie on the slab-shaped sample receiving apparatus,
passing at least some of the luminescence radiation through the fibre-optic plate from the lower side to an upper side of same, each samples being assigned a plurality of fibres of the fibre-optic plate,
guiding the luminescence radiation through a camera optical unit,
recording the luminescence radiation incident on a light-sensor array, with each of the samples being able to be assigned a spectral distribution and/or an intensity, averaged over the sample, of the luminescence radiation, with the luminescence radiation emanating from a respective sample being at least partly homogenized prior to the incidence on the light-sensor array.

16. The method according to claim 15, further comprising: heating the fibre-optic plate to a temperature of the lower side of the fibre-optic plate which is equal to or higher than a sample temperature.

* * * * *